United States Patent Office 3,321,410
Patented May 23, 1967

3,321,410
EXPANDED PERLITE AND METHOD FOR THE FORMATION THEREOF
Roger A. MacArthur, Hinsdale, and Anthony L. Garnero, Wheaton, Ill., assignors, by mesne assignments, to Central Manufacturing District, Chicago, Ill., a trust of Massachusetts
No Drawing. Filed Feb. 17, 1965, Ser. No. 433,448
11 Claims. (Cl. 252—378)

This invention relates to the production of expanded perlite. In particular, the invention is concerned with expanded perlite which is adapted to be used in the preparation of lightweight structural panels.

It has been recognized that expanded perlite can be advantageously employed in the production of structural panels and reference is made to applicants' copending application Ser. No. 57,171, filed Sept. 20, 1960, and entitled "Panels of Expanded Perlite and Method and Machine for Same," for a discussion relative to the production of such panels. As noted therein, expanded perlite structures can be produced with the structures being characterized by relatively high strength, low density, good dimensional stability, good appearance, and good acoustical properties.

The production of expanded perlite for use in the formation of structural panels differs considerably from the production of similar panels produced from clay or shale particles. A complete discussion of such differences is set forth in said copending application; however, the basic distinction lies in the fact that the reaction of perlite during expansion in response to heat differs materially from the conditions prevailing in the treatment of clay or shale. Perlite is characterized by the presence of combined water which begins to be released when the perlite is heated to about 1200° F. The combined water and released vapors act as a plasticizer for the perlite particles whereby a plasticity is experienced during continued heating above 1400° F. Agglomeration can be achieved if the particles are rapidly heated to a temperature within the range where vapor release and plasticity occur simultaneously, for example in the temperature range of 1400–2400° F. and preferably between 1600 and 2400° F.

In the perlite reaction, the reasonably rapid elimination of the last of the combined water requires heating to a temperature above 1800° F. and in most cases, between 2200 and 2400° F. This is required since the removal of the combined water prevents fusion or reduction of the perlite to a pyroplastic state at lower temperatures. Accordingly, plasticity for purposes of agglomeration can economically only be achieved by heating to a fusion stage preferably in excess of 2200° F., if combined water has been driven out. Therefore, slow heating of the perlite particles is undesirable since the elimination of the combined water prior to the achieving of a pyroplastic state will substantially decrease the amount of expansion that will occur and will require heating to excessive temperatures to achieve fusion. Even at this second stage of fusion, any expansion which may have previously been achieved will tend to be lost by collapse of the expanded particles, and the heating will also reduce the perlite to a relatively fluid state resulting in the formation of a glassy phase.

The aforementioned copending application achieves the formation of perlite panels having the desired characteristics by controlling the treatment of the perlite within certain limits. Specifically, the disclosure provides a treating operation which provides for the rapid heating of perlite particles to a temperature between 1400 and 2000° F. The rapid heating is accomplished in a few minutes during travel of the perlite through a furnace, and the desired expansion and agglomeration will occur when the operation is properly controlled.

In the discussion of the aforementioned copending application, reference is made to the use of a flux in combination with the perlite particles. This flux acts to improve the quality of the completed panels since the flux collects on the surfaces of the perlite particles and functions as a binder to more effectively secure the expanded particles one to another in the final structure. The fluxes employed also react with surface portions of the perlite and result in a lower melting point combination.

It is considered desirable to employ fluxes in procedures of the type described; however, the use of such fluxes has been found to produce certain disadvantages. These problems relate to the fact that perlite expanded with continued heating will gradually fuse to a more or less dense mass with the time necessary for fusion depending upon the temperature and type of perlite ore. When a flux is employed, the time required for sintering is considerably shortened and, therefore, the heating of the perlite must be carefully controlled so that the desired amount of sintering will take place without any additional heating which would lead to fusion and substantial loss in the amount of expansion.

It has also been recognized that the sintered or agglomerated product containing active flux will have less desirable characteristics from the standpoint of temperature resistance. Thus, the presence of the active flux will tend to produce a lower softening point in the final product whereby the panels produced will have a maximum temperature of use less than panels which do not contain such flux.

It is an object of this invention to provide improved perlite panels and improved methods for their manufacture.

It is a more specific object of this invention to provide a system for the production of perlite panels wherein a flux is employed whereby the advantages of the flux can be realized while the disadvantages of the flux can be eliminated.

It is an additional object of this invention to provide techniques for the production of perlite panels which provide for the use of a flux but which do not require particularly precise controls from the standpoint of reaction time.

It is a still further object of this invention to provide perlite panels which contain flux, and which are capable of use at extremely high temperatures.

These and other objects of this invention will appear hereinafter and it will be understood that the specific examples included herein are provided only to illustrate the concepts of this invention and are not to be considered as limiting the scope of the invention.

The instant invention is generally directed to the formation of perlite panels wherein perlite particles are exposed to heat for expansion and wherein sintering of the particles is undertaken to achieve an agglomerated final product ideally suited for use as structural panels. In the processing of this invention, the perlite particles are mixed with a flux whereby the reaction to achieve a pyroplastic state, and to achieve expansion and ultimate fusion for agglomeration, can be efficiently undertaken.

In addition to the use of the perlite and a flux, the technique of this invention also provides for the use of clay in particle form whereby an unusual reaction can be achieved to eliminate the disadvantages previously recognized when fluxes were employed in combination with perlite particles. It has specifically been found that the presence of clay in the combination of perlite and flux will retard or completely stop the fluxing action when the perlite has completed its expansion and firmly sintered. The retarding or stopping action of the clay thus reduces the criticality of time and temperature in the process.

The inclusion of the clay to reduce or eliminate the action of the flux after the sintering step also provides advantageous results with respect to the final product. Specifically, the softening point of the structural panels which result from the technique of this invention closely approaches the high softening point of perlite panels which are produced without flux. Accordingly, the instant invention is characterized by the ability to produce a selective action of the flux wherein the flux provides advantageous results until a desired sintered product is achieved and is thereafter rendered more or less inert so that it will not be in any way detrimental in the ensuing treatment or in the final product.

In the preferred form of this invention, the flux comprises a silicate selected from the group consisting of the alkali metal silicates. Sodium silicate is preferably used as the flux because of its ready availability and relatively low cost. Furthermore, the sodium silicate has been recognized as completely suitable with respect to the achievement of the objects of this invention.

Suitable clays comprise the grade UC55 clay produced by United Clay Mines or ASP 170 produced by the Mineral Chemicals Philipp Corporation. Kaolin clay is generally considered to be the most suitable for the purposes of this invention; however, any of the clays referred to or their equivalents are contemplated. Such clays are preferably provided in fine particle form with a substantial proportion being finer than one micron. It will be understood that the size of the clay particles is preferably fine due to the fact that fine particles will more readily enter into reactions. The size of these particles is referred to only for the purpose of expressing conventional reaction techniques, and it will be understood that the invention is not to be limited by any particular size ranges.

The combinations of perlite, flux and clay which are adapted for use in accordance with this invention can be selected from the following:

| | Parts |
|---|---|
| Perlite | 100 |
| Solid flux | [1] 0.5–5 |
| Clay | 1–10 |

[1] Preferably provided in aqueous solution.

In the preferred form of this invention, the amount of clay is greater than the amount of solid flux, and an amount of clay equal to twice the amount of flux is a highly desirable combination.

As previously indicated, sodium silicate is preferred for use as the flux. Where such a flux is employed, the soda-silicate ratios are preferably between 1:1 and 1:4. For convenience, the sodium silicate or any other flux employed is provided in an aqueous solution.

The following examples are considered representative of the procedures of this invention:

*Example I*

| | Parts |
|---|---|
| Perlite | 100 |
| Sodium silicate (solids in a 39% aqueous solution with a soda-silica ratio of 1:3.25) | 2.5 |
| Kaolin | 4 |

*Example II*

| | Parts |
|---|---|
| Perlite | 100 |
| Sodium silicate (solids in a 39% aqueous solution with a soda-silica ratio of 1:2) | 2.5 |
| Kaolin | 4 |

The advantageous results of this invention are best recognized when comparisons are made between these results and similar procedures lacking the specific combination. Particularly, experiments have been undertaken wherein perlite and sodium silicate were employed in combination, and the mixture was heated beyond the softening point and held at such high temperatures for a relatively extended period. Such treatment of the combination resulted in a shrinkage of the product by an amount in excess of 70 percent, the shrinkage figure being based upon the volume of the mass after expansion.

In a test under precisely the same conditions employing the combination of sodium silicate solids and clay in the ratio of 3:2, the shrinkage figure was reduced to 42 percent. Finally, the severe test conditions were repeated with a ratio of sodium silicate to clay of 1.5:4, and in this case, the percent shrinkage was 19 percent. The tests demonstrated the great improvements which can be achieved when the combination of this invention is employed, and they also demonstrate that the best results are achieved where the amount of clay exceeds the amount of sodium silicate.

The aforementioned comments concerning the effect of the clay on the fluxing action of the sodium silicate should not be considered as limiting the scope of the invention. It will be appreciated that the apparent ability of the clay to reduce or eliminate the fluxing action after the desired amount of sintering is achieved and the apparent ability to increase the softening point comprises a theory based on observation.

In the formation of structural panels from the products of this invention, operations such as described in the aforementioned copending application are contemplated. In addition, any other conventional means capable of achieving the desired conditions for undertaking reaction of the disclosed combination is contemplated.

The procedures discussed in the aforementioned copending application are generally suitable for conducting the techniques of this invention although time and temperature are not critical factors to the extent discussed in said application. In a typical process, the perlite particles in combination with the flux and clay particles are heated to a temperature within the range of 1600 to 2400° F. The heat is preferably uniformly distributed throughout the mass of particles, and heating is continued for a time sufficient to cause the particles to expand and to achieve a state of fusion to the extent that the expanded particles will agglomerate into a self-sufficient mass. The heating is discontinued as soon as possible after the desired state is achieved in the agglomerated perlite. It will be recognized, however, that this desired state will be maintained over a significantly longer period under the temperature conditions prevailing whereby detrimental shrinkage will not result as long as the time limits are controlled to a reasonable degree.

It will be understood that various changes and modifications may be made in the above described techniques which provide the characteristics of this invention without departing from the spirit thereof particularly as defined in the following claims.

That which is claimed is:

1. In a process for treating perlite wherein the perlite is heated to a temperature which causes the perlite to expand and causing surface portions of the expanded perlite to fuse to result in sintering of the perlite into an agglomerated mass, the improvement comprising including from 0.5 to 5 parts by weight of a flux per 100 parts by weight of said perlite and from 1 to 10 parts by weight clay per 100 parts of said perlite in admixture with said perlite, said flux being selected from the group consisting of the alkali metal silicates, and heating to raise the temperature of the mixture to the pyroplastic state for the perlite for expansion of the perlite in the presence of the clay and flux and for concurrent agglomeration of the mixture to achieve said agglomerated mass.

2. A process in accordance with claim 1 wherein the amount of said clay exceeds the amount of said flux.

3. A process in accordance with claim 1 wherein said clay is employed in an amount approximately twice the amount of said flux.

4. A process in accordance with claim 1 wherein said flux comprises sodium silicate and wherein said clay is a kaolin clay.

5. A process in accordance with claim 4 wherein said soda-silica ratio of said sodium silicate is between 1:1 and 1:4.

6. In a process for treating perlite wherein the perlite is heated to a temperature which causes the perlite to expand and causing surface portions of the expanded perlite to fuse to result in sintering of the perlite into an agglomerated mass, the improvement comprising including from 0.5 to 5 parts by weight of a flux per 100 parts by weight of said perlite and from 1 to 10 parts by weight clay per 100 parts of said perlite in admixture with said perlite, said flux being selected from the group consisting of the alkali metal silicates, said flux and clay being provided in finely divided particle form, and heating the mixture to a temperature between 1600–2400° F. to cause expansion of the perlite particles while in the presence of the clay and flux and concurrent agglomeration to achieve said agglomerated mass.

7. A process in accordance with claim 6 wherein said flux is provided in an aqueous solution.

8. A process in accordance with claim 6 wherein said clay is employed in an amount approximately twice the amount of said flux.

9. A process in accordance with claim 8 wherein said flux comprises sodium silicate and wherein said clay is a kaolin clay.

10. A process in accordance with claim 9 wherein said soda-silica ratio of said sodium silicate is between 1:1 and 1:4.

11. The product produced by the process of claim 6.

References Cited by the Examiner

UNITED STATES PATENTS

| Re. 19,919 | 4/1936 | Bechtner | 252—378 |
| 1,743,551 | 1/1930 | Keeth | 252—378 |
| 1,830,253 | 11/1931 | Bechtner | 252—378 |
| 2,388,060 | 10/1945 | Hicks | 252—378 |
| 2,526,073 | 10/1950 | Gardner | 252—378 |

OSCAR R. VERTIZ, *Primary Examiner.*

H. S. MILLER, *Assistant Examiner.*